(12) United States Patent
Persson et al.

(10) Patent No.: US 9,020,753 B2
(45) Date of Patent: Apr. 28, 2015

(54) METHOD, COMPUTER PROGRAM AND APPARATUS FOR DETERMINING AN OBJECT IN SIGHT

(75) Inventors: Johan Persson, Solna (SE); Josefin Lofstrom, Hasselby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 224 days.

(21) Appl. No.: 13/697,098

(22) PCT Filed: May 12, 2010

(86) PCT No.: PCT/SE2010/050522
§ 371 (c)(1),
(2), (4) Date: Nov. 9, 2012

(87) PCT Pub. No.: WO2011/142700
PCT Pub. Date: Nov. 17, 2011

(65) Prior Publication Data
US 2013/0060464 A1 Mar. 7, 2013

(51) Int. Cl.
*G01C 21/34* (2006.01)
*G01C 21/20* (2006.01)
*H04W 4/02* (2009.01)

(52) U.S. Cl.
CPC ............. *G01C 21/20* (2013.01); *H04W 4/02* (2013.01); *H04W 4/021* (2013.01); *H04W 4/026* (2013.01)

(58) Field of Classification Search
CPC ....... G01S 19/42; G01C 21/28; G01C 21/005
USPC ......... 701/412, 426, 438, 445, 449, 469, 473; 353/11
See application file for complete search history.

(56) References Cited

U.S. PATENT DOCUMENTS

| | | | |
|---|---|---|---|
| 6,535,734 B1 * | 3/2003 | Miller et al. | 455/429 |
| 6,816,781 B2 * | 11/2004 | Imanishi | 701/428 |

(Continued)

FOREIGN PATENT DOCUMENTS

| | | |
|---|---|---|
| WO | 02059716 A2 | 8/2002 |
| WO | 2009024882 A1 | 2/2009 |

*Primary Examiner* — Mary Cheung
(74) *Attorney, Agent, or Firm* — Rothwell, Figg, Ernst & Manbeck, P.C.

(57) ABSTRACT

A method of determining an object in sight with an electronic apparatus, where the object being associated with a Point-Of-Interest, POI, item in a database is disclosed. The method comprises estimating (100) a position of the electronic apparatus by a positioning mechanism; estimating (102) magnitude of error of estimated position; estimating (104) a direction when orienting the electronic apparatus towards the object by a magnetic sensor of the electronic apparatus; estimating (106) magnitude of error of position error of estimated direction; calculating two intersecting imaginary lines in a model of the environment of the electronic apparatus, wherein the two imaginary lines intersect a line of the estimated direction at a side of the electronic apparatus distal to said object, and where a mutual angle between the two imaginary lines and the line of the estimated direction is based on the estimated magnitude of error of estimated direction, and the position where the imaginary lines intersect is determined from the estimated position and the magnitude of error of estimated position, such that an area between the two imaginary lines is formed (108) based on a determined maximum distance of sight; and determining (110) a POI associated with a position within said area such that information about the object associated with the determined POI is obtainable. A computer program and an electronic apparatus are also disclosed.

17 Claims, 6 Drawing Sheets

(56) References Cited

U.S. PATENT DOCUMENTS

| | | | |
|---|---|---|---|
| 7,383,125 B2 * | 6/2008 | de Silva et al. | 701/532 |
| 7,589,715 B2 * | 9/2009 | Tanaka et al. | 345/175 |
| 2003/0184594 A1 | 10/2003 | Ellenby et al. | |
| 2009/0281720 A1 * | 11/2009 | Jakobson | 701/202 |
| 2009/0315766 A1 | 12/2009 | Khosravy et al. | |

* cited by examiner

METHOD, COMPUTER PROGRAM AND APPARATUS FOR DETERMINING AN OBJECT IN SIGHT

CROSS-REFERENCE TO RELATED APPLICATION

This application is a 35 U.S.C. §371 National Phase Application from PCT/SE2010/050522, filed May 12, 2010, and designating the United States.

TECHNICAL FIELD

The present invention generally relates to a method of determining an object in sight, a computer program for implementing the method and an electronic apparatus capable of determining the object.

BACKGROUND

Electronic apparatuses can have capability of measuring their position and orientation. This can be used for identification of an object by pointing at it. An example of this is given in US application No. 2009/0315766 A1, which discloses direction-based services for a device based on direction information and/or other information, such as location information, and to automatic switching between disparate networks, sources of information and/or services upon which the direction-based services are based. This can be provided with a device which can include compass, e.g., magnetic or gyroscopic, to determine a direction, and location based systems for determining location, e.g., GPS. The device receives point of interest data from one or more pointing based services based on pointing information associated with at least one direction of the device via a first network. If or when losing connectivity to the first network, the device identifies at least one other source of point of interest data to which the device can connect via a second network, and automatically connects to the second network to receive the point of interest information. The solution is intended to safeguard that information about the point of interest is available.

A user of such a device can find the service less attractive if the intended object is not found after being pointed out by the user. Safeguarding of availability to the information is of no use if not the intended object is found. It is therefore a desire to improve ability to capture the intended object.

SUMMARY

An object of the invention is to at least alleviate the above stated problem. The present invention is based on the understanding that by considering reasonable assumptions on errors in measurements and estimates, the chance of providing a correct object from the user's pointing action is enhanced. The inventors have further provided embodiments for efficient calculations with regard to determining the correct object.

According to a first aspect, there is provided a method of determining an object in sight, the object being associated with a Point-Of-Interest, POI, item in a database, with an electronic apparatus. The method comprises estimating a position of the electronic apparatus by a positioning mechanism; estimating magnitude of error of estimated position; estimating a direction when orienting the electronic apparatus towards the object by a magnetic sensor of the electronic apparatus; estimating magnitude of error of estimated direction; calculating two intersecting imaginary lines in a model of the environment of the electronic apparatus, wherein the two imaginary lines intersect a line of the estimated direction at a side of the electronic apparatus distal to said object, and where mutual angles between the two imaginary lines and the line of the estimated direction are based on the estimated magnitude of error of estimated direction, and the position where the imaginary lines intersect is determined from the estimated position and the magnitude of error of estimated position, such that an area between the two imaginary lines is formed based on a determined maximum distance of sight; and determining a POI associated with a position within said area such that information about the object associated with the determined POI is obtainable.

In case a POI is enabled to have a physical dimension, the method may further comprise tracing along each of the two imaginary lines such that a POI whose dimension intersects any of the imaginary lines is determined such that information about the object associated with the determined POI is obtainable.

The method may further comprise excluding, when considering the area, a part of the area defined between the position where the imaginary lines intersect, between the imaginary lines, and an imaginary area around the estimated position drawn up by the estimated magnitude of error of position.

The estimating of magnitude of error of estimated direction may comprise assigning a predetermined magnitude of error, or taking a number of samples of direction measurement, and estimating the magnitude of error based on said samples using a statistical model.

The determining of a POI associated with a position within said area may comprise determining a direction between the position where the imaginary lines intersect and a candidate POI; and comparing the direction with the imaginary lines, wherein the candidate POI is considered associated with a position within said area if the direction is between the imaginary lines.

The determining of a POI associated with a position within said area may comprise defining the determined maximum distance of sight as a line perpendicular to the estimated direction; defining a triangle from the imaginary lines and the determined maximum distance of sight; and calculating Barycentric coordinates of the POI in the triangle, wherein the candidate POI is considered associated with a position within said area if all of the Barycentric coordinates are between 0 and 1.

The determining of a POI associated with a position within said area may comprise determining a point P along one of the imaginary lines being closest to a candidate POI; determining a help line comprising the point P and a position T of the candidate POI such that the line is described by $L=P+a(T-P)$, where a is a scalar value and L, P and T are matrices; and determine the scalar a for a point Q where the help line intersects the other of the imaginary lines, wherein the candidate POI is considered associated with a position within said area if the scalar a is 1 or greater for that point.

According to a second aspect, there is provided a computer program comprising computer program code comprising instructions to cause a processor on which the computer program code is executed to perform the method according to the first aspect.

According to a third aspect, there is provided an electronic apparatus comprising a receiver connected to a positioning mechanism such that a position of the electronic apparatus is able to be estimated; a compass mechanism comprising at least one magnetic sensor such that direction of the electronic apparatus is able to be estimated; an error handling mechanism arranged to process signals associated to estimation of position and direction such that estimates of magnitude of error of estimated position and magnitude of error of estimated direction is provided; a database access mechanism arranged to access a database with a Point-Of-Interest, POI, item, wherein the POI item being associated an object to be identifiable with aid of the electronic apparatus when in sight; and a processor arranged to calculate two intersecting imaginary lines in a model of the environment of the electronic apparatus, wherein the two imaginary lines intersect a line of the estimated direction at a side of the electronic apparatus distal to said object, and where a mutual angle between the two imaginary lines and the line of the estimated direction is based on the estimated magnitude of error of estimated direction, and the position where the imaginary lines intersect is determined from the estimated position and the magnitude of error of estimated position, such that an area between the two imaginary lines is formed based on a determined maximum distance of sight, and to determine, from the database, a POI associated with a position within said area such that information about the object associated with the determined POI is obtainable.

In case a POI is enabled to have a physical dimension, the processor may further be arranged to trace along each of the two imaginary lines such that a POI whose dimension intersects any of the imaginary lines is determined such that information about the object associated with the determined POI is obtainable.

The processor may further be arranged to exclude, when considering the area, a part of the area defined between the position where the imaginary lines intersect, between the imaginary lines, and an imaginary area around the estimated position drawn up by the estimated magnitude of error of position.

The error handling mechanism may be arranged to receive a number of samples of direction measurement from the compass mechanism such that an estimate of the magnitude of error is based on said samples using a statistical model.

The electronic apparatus may further comprise a user interface, UI, and an application, wherein the application is arranged to receive information about the object associated with the determined POI, to process the information into presentation information, and to provide the presentation information to the UI such that it is user perceivable. The application may further be arranged to receive, through the UI, a user input in response to the presentation information. The electronic apparatus may further comprise a transceiver arranged to communicate with a communication network, wherein the application further may be arranged to transmit information about the determined POI via the transceiver.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
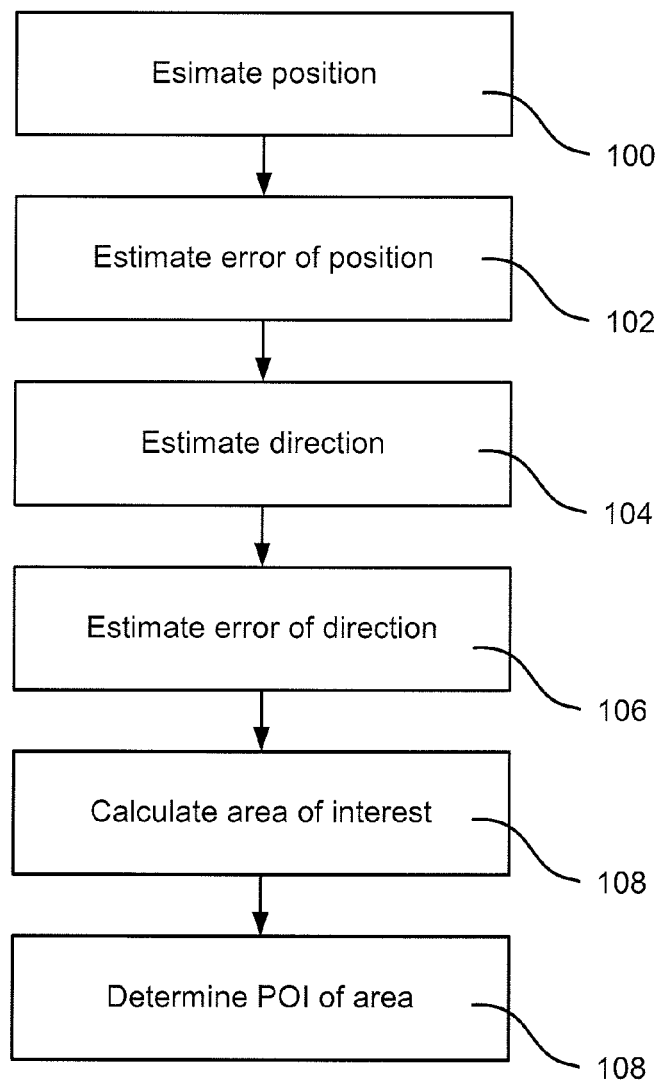
FIG. 1 is a flow chart illustrating a method according to an embodiment.

For the understanding of the principles where the above demonstrated invention is applicable, a few use cases will be described. From this, many modifications therefrom, and other use cases will readily be understood. After the use cases, detailed information about embodiments for achieving them will be demonstrated.

In a first use case, an application where a user is enabled to gain additional information about an object, such as a restaurant, movie theatre, store, monument or other attraction, is provided. The user points at the object, which is a physical item such as a building, using an electronic apparatus, e.g. a mobile phone, a Global Navigation Satellite System receiver, a Personal Digital Assistant or other portable apparatus with processing and positioning capabilities. The apparatus determines its position and the pointing direction, and from that, with aid of a database comprising at least one Point Of Interest, POI, their positions and information about them, the apparatus is able to determine one or more objects associated with respective POI and present relevant information to the user. For example, the user points at a castle, and gets information about its name, when it was built or other historical facts, and possibly opening hours or such information. In another example, the user points at a restaurant, and the restaurant is determined from its associated POI, wherein the user may get information about the menu or opinions from previous visitors about the restaurant. Another example can be that the user points at a movie theatre, gets information about movies, and may buy tickets to one of the movies. Thus, the information can be present entirely in the database, or as a combination of presence in the database and on the Internet, where appropriate links can be provided from the database. More than one POI can be found in the direction where the user is pointing the apparatus. In such cases, the user can be prompted to select among found objects, possibly with aid such as by provided image(s), information on distance to the object, or other significant information to help the user choose the correct one.

In a second use case, an application for reporting need of service is provided. The need of service can be repair of broken streetlights, full trashcans, leaking hydrants, or other repair needs. The user identifies a need of service, and points the electronic apparatus towards the object of need and activates the application. The object is determined, similar to the description of the first example, and a message is sent, e.g. as a short message service, to a service office which then can schedule service of the object.

Thus, the approach can enhance information acquirement, pleasure/leisure use, and/or professional use.

From a technical point of view, there are inaccuracies inherent in pointing out objects this way: error in estimated position, error in pointing, and error in measurement of direction. To still be able to capture the object, the approach presented below of determining one or more reasonable POIs that can be relevant provides a usable function without causing the user any additional complexity of use.

FIG. 1 is a flow chart illustrating a method according to an embodiment. The method comprises, when a user activates the pointing function, estimating 100 the position of the electronic apparatus. The position can be estimated with aid of a Global Navigation Satellite System, GNSS, such as the Global Positioning System, GPS, and/or by triangulation from base stations of a cellular telecommunication system. From the measurements provided when estimating 100 the position, an estimate of error of the position can be calculated, e.g. from signal strength of signals measured and processed, the number of signals used, etc., such that a magnitude of positioning error can be estimated 102. Thus, the error itself is unknown, but an estimate of confidence is provided such that an area in which the electronic apparatus is most probably located in can be determined. The area can be a circle with its centre in the middle of the circle and the radius of the circle being the estimated magnitude of error. If the estimate of error is different for different directions, the area can have other shapes, such as an ellipse.

Figure 2:
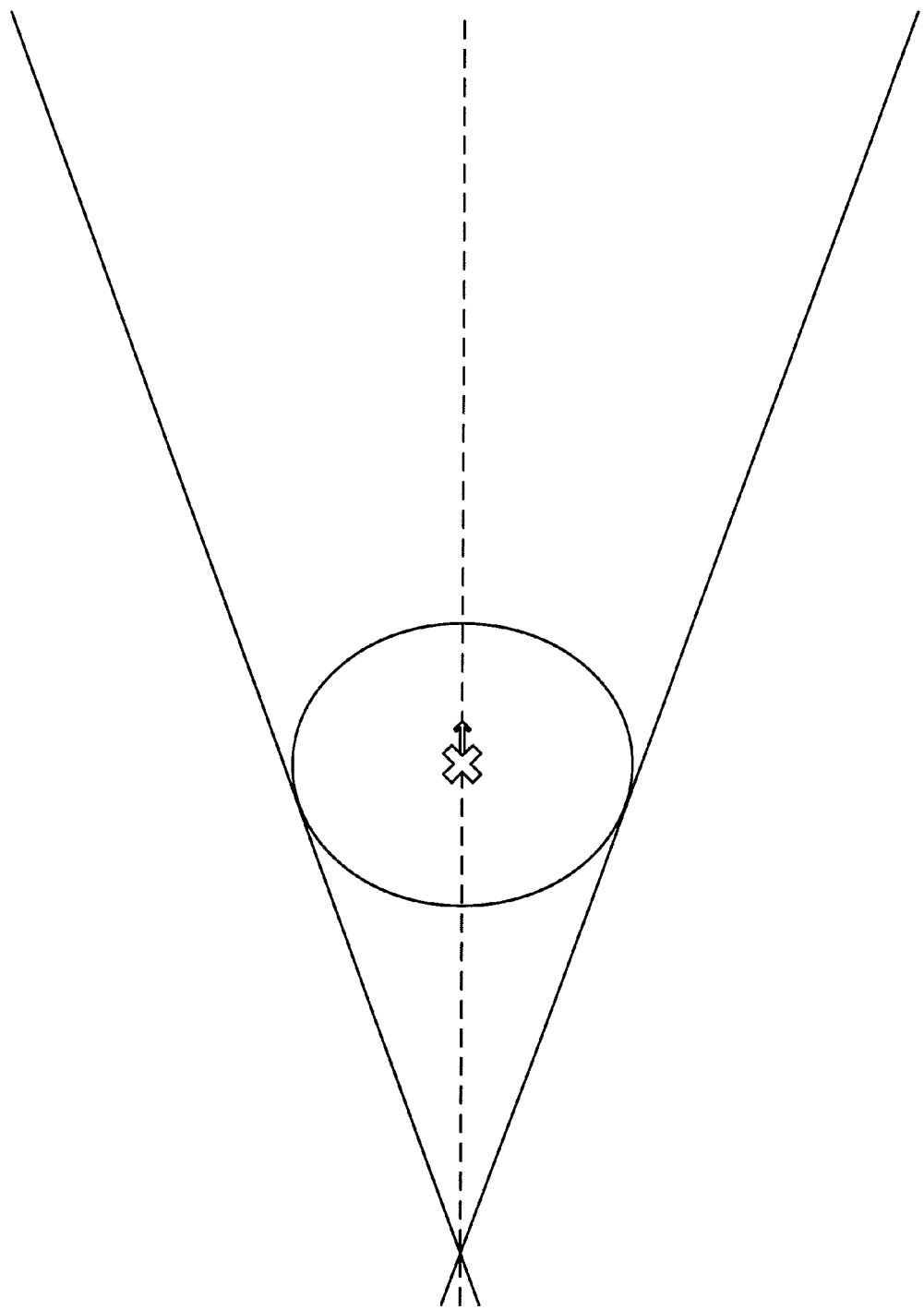
FIG. 2 schematically illustrates assigned imaginary lines in relation to estimated position and magnitude of error of estimated position.

The direction of pointing of the electronic apparatus is estimated 104. The estimation of direction is preferably made by measurement of earth magnetic field, i.e. a compass, by one or more magnetic sensors. The estimate can be based on one or a plurality of measurements. A plurality of measurements, performed during a very short time, e.g. 1 s, can provide a more safe result as the user in the case of only one measurement may "shake" out of target. The plurality of measurements can thus be statistically modelled, e.g. averaging, by taking a median value, or other more sophisticated method, to achieve a proper estimate of direction. From such a calculation, a parameter of error in direction can also be obtained, e.g. deviation. This possible parameter, and knowledge about accuracy of direction sensor can be used in estimation 106 of magnitude of error in direction. However, for simplicity, the estimate of magnitude of error in direction can also be set to a predetermined value based on empiric tests or user settings. In any of the cases, the magnitude of error in direction is used for determining a sector in which POIs should be searched. The sector is formed by calculating two intersecting imaginary lines in a model of the environment of the electronic apparatus, e.g. an electronic map or other representation. For the calculation of direction, to capture any POI that the user may have pointed at, the assumption that the user may be in any point within the area provided from the estimation of position and error of position. Thus, the imaginary lines intersect at a position "behind" the user to take all of the possible positions into account, as illustrated in FIG. 2. In FIG. 2, a circle illustrates all likely positions where the user may be. The centre of the circle is the estimate of position. The dotted line indicates the estimated direction towards the object, and the solid lines indicate the imaginary lines. Here, it can be seen that the sector covers all reasonable directions from all reasonable points, i.e. the estimated magnitudes of errors are taken into account to capture an object that is pointed at.

Figure 3:
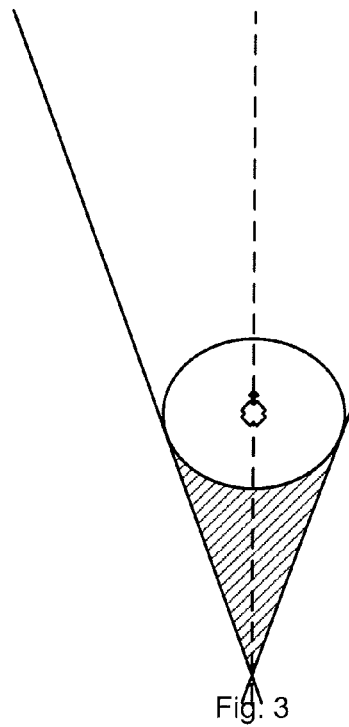
FIGS. 3 and 4 illustrate exclusion of part of determined area according to embodiments, respectively.
Figure 4:
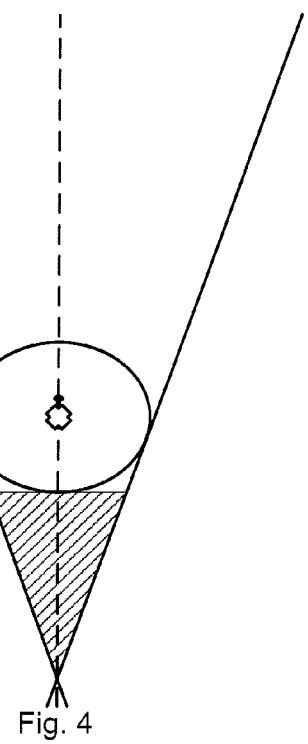
Figure 5:
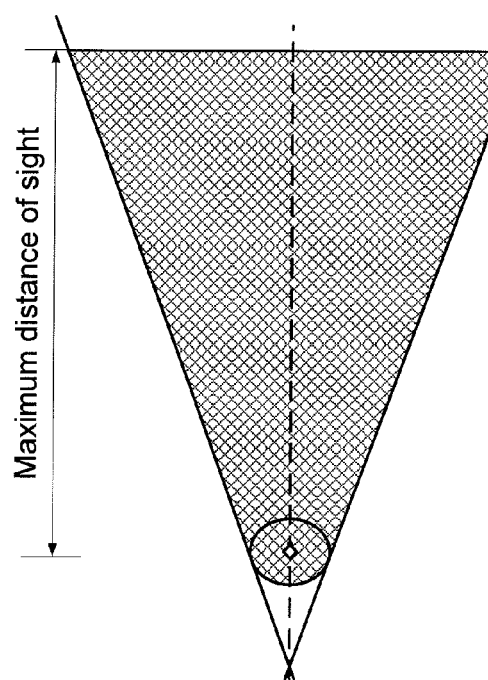
FIGS. 5 to 8 illustrate formed area according to embodiments, respectively.
Figure 6:
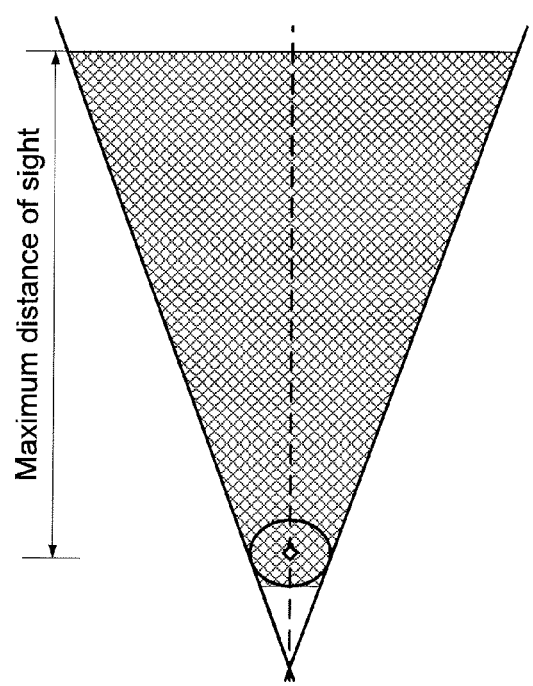
Figure 7:
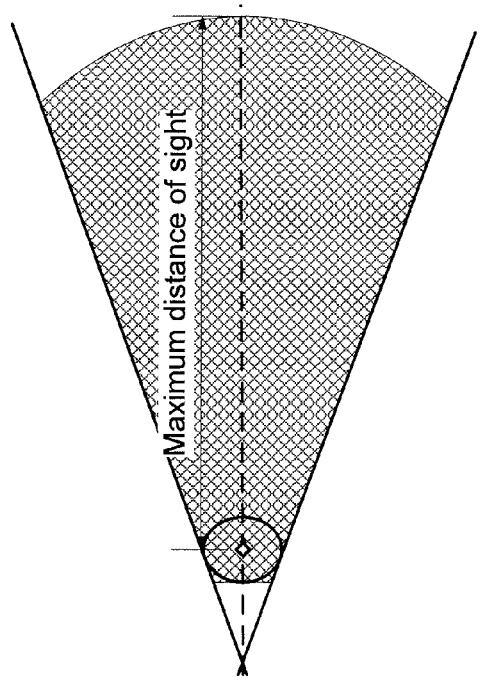
Figure 8:
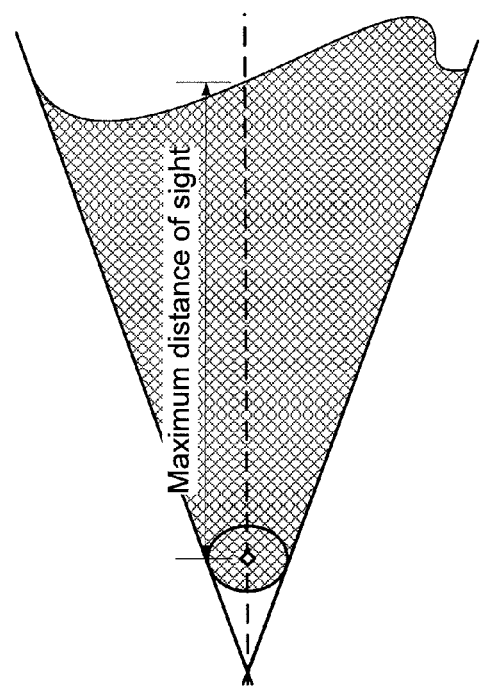

Returning to FIG. 1, an area is calculated 108 based on the sector and a predetermined maximum distance of sight. When forming the area as a sector between the imaginary lines, a part of the area will definitively be unlikely for an object, i.e. the area behind any of the probable positions, since the imaginary lines intersect behind the user, as can be seen in FIG. 2. It is possible to exclude this unlikely area when searching for POIs as illustrated in FIG. 3 by marked area. The excluded area can be simplified to a triangle with two sides along the imaginary lines and the third side forming a tangent to the area of possible positions as illustrated in FIG. 4 by marked area. Here, it should be noted that "distance of sight" can be a practically and abstract measure, and not absolutely determined from what the user is able to see, or a true calculated/estimated measure. The maximum distance of sight can be defined as a straight line perpendicular to the estimated direction such that the formed area becomes a triangle as illustrated in FIGS. 5 and 6. This is a convenient form for the sake of some calculations, as will be further elucidated below. The maximum distance of sight can also be defined such that the area becomes a circle sector as illustrated in FIG. 7. The magnitude of the maximum distance can be predefined from parameters from the model of the environment, e.g. different for city, suburban and rural areas, or can be predefined from parameters from the application used, e.g. different for finding house, monument and extensive objects. From an advanced model of the environment, and also upon estimating altitude of the user, the maximum distance of sight may also be truly estimated for forming the area as illustrated in FIG. 8.

Figure 9:
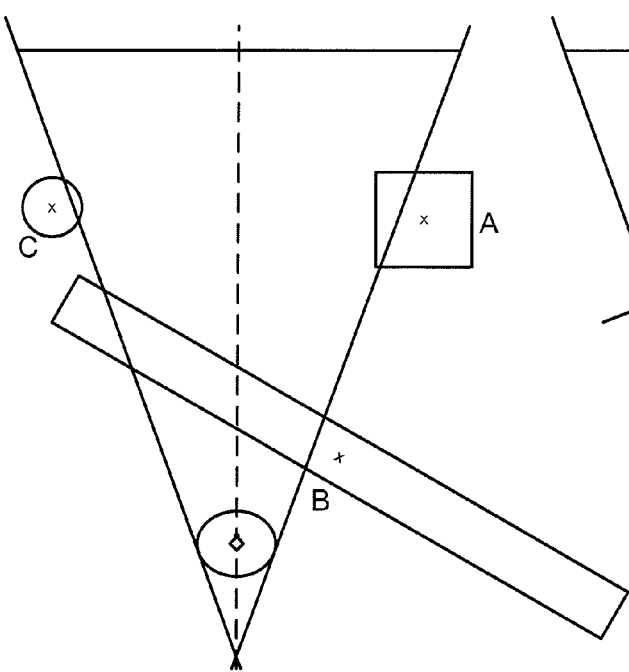
FIG. 9 illustrates capturing of objects given dimensions.

When the area has been calculated 108, the POIs present within the area are searched for. From the found set, if any, a POI is determined 110, possibly with interaction from the user, and/or based on criteria set up by the application, for example that only POIs representing trashcans are plausible. The POIs can be modelled as point items, i.e. not having any area and only being represented by a coordinate. Alternatively or additionally, at least some objects represented with POIs can be modelled as an object having physical dimensions. For capturing of such objects, ray tracing can be performed along the imaginary lines to determine if the imaginary lines intersects the dimensions of the object. One way of performing this is to assign the corners of the object as a coordinate to be checked if it is within the area, and if any of the assigned coordinates is within the area, the object is determined as pointed at. This would have worked for the object A illustrated in FIG. 9. However, for object B, this would not have worked. For capturing such an object B, determination whether any of the imaginary lines intersect boundaries of the object. This latter determination also works for objects without corners, such as object C. Object C can also be considered as a model of a point object, but where any error in assigned coordinates of the object is considered by assigning a surrounding area, e.g. with an assigned or predetermined radius.

The approach of finding objects on or close to the boundary of the area is called Ray Tracing after a method frequently used in computer graphics. When the approaches above captures all POIs which have an assigned coordinate between the two imaginary lines or within the area, the Ray Tracing is able to capture further POIs when represented as objects having dimensions. For example, if Ray Tracing is performed along the left imaginary line of FIG. 9, the circular object C is intersected. This can be determined by calculating a point S where the imaginary line is closest to the centre of the circle (defined by point C). The from this, the distance between points S and C can be calculated and then compared with the radius of the circle C. If the distance is less than the radius, the circle is intersected, and the object captured to the set of POIs. For objects defined as polygons, intersection of any of the sides, i.e. line segments, of the polygon by any of the imaginary lines can be calculated, and such objects can be captured.

The direction can be assigned in the horizontal plane, wherein the "area" also is an area in the horizontal plane, which has been used above for illustrating the invention since illustration of the principle in two-dimensional drawings is feasible. However, the direction can also be any direction in space, wherein the "area" becomes a segment of space. The segment of space can be conical or pyramidal. The estimation in elevation can be made by a separate sensor, e.g. an accelerometer sensing gravity. Due to the two different sensors for azimuth and elevation estimation, the estimated error magnitude for azimuth and elevation can be different, which affects the form of the space segment. For the three-dimensional case, the POIs can be modelled as point items a coordinate in space. Similarly to what is demonstrated above, at least some POIs can be modelled as an object having physical dimensions, in this case in three dimensions.

The estimation of the current position of the apparatus can be relative to any coordinate system, as long as the coordinates of the POIs are given in the same coordinate system or some method to convert between the two systems is used. The position of the apparatus can for example be established through the use of GNSS, cell tower triangulation or wifi hotspot triangulation. The estimation of the error in the estimated position, since methods used for estimating the position of normally have limited accuracy, provides for measures to be taken to compensate for this fact. The error of the estimated position can for example be estimated using the Horizontal Dilution of Precision (HDOP) value that GPS-receivers commonly report, or by estimating the probability distribution of the position estimation. Direction means an estimation of how the apparatus is directed relative to the coordinate system used for positioning and POIs, and can for example be the reading from a digital compass, a combination of the data from a magnetometer and accelerometer, etc., and would thus be the bearing of the apparatus. Similar to the position error, a direction error estimate is provided. The error can be estimated through the use of confidence intervals and assumptions about the distribution of the direction estimations. A number of samples, e.g. some tenths of samples collected during a second or fraction of second while the user is pointing the apparatus towards the object of interest, and from these samples, which essentially is taken from one and the same direction, a statistical analysis is made. An assumption that the samples are normal distributed around the actual direction enables calculation of a confidence interval within which, say by 95%, the actual direction is present. Since the number of samples is limited due to processing and a feasible time for the user to hold the apparatus in the direction, and the lack of proper standard deviation, the statistical model is preferably using the Student's t-distribution rather than normal distribution. The calculation can be performed by:

$$I = z \frac{S_n}{\sqrt{n}}$$

where I is half the interval, z is the value for the t-distribution at the chosen confidence interval and for the number of samples, $S_n$ is the variance of the samples, and n is the number of samples, i.e. the direction estimate is the average of the samples, and the estimated error is +/−I. To this estimation, further knowledge about introduced errors, e.g. about systematic errors, can be added.

Alternatively, the estimation of error is based on experience, and may be set when designing the application, e.g. as a fixed +/− interval.

One way of determining whether the POI is between the imaginary lines is to calculate the angle, in relation to a used coordinate system, e.g. compass directions, between one of the imaginary lines from the direction error estimation and a line passing through the coordinates of the point of interest and then to compare this angle to the angle between the two lines from the direction error estimate.

Another way to achieve the same result is to use so called Barycentric Coordinates. By defining a maximum distance away from the user that a point of interest, i.e. the "maximum distance of sight" can have and still be counted, a triangle is defined and by calculating the Barycentric coordinates of the point of interest in this triangle, it is possible to determine whether the point is within the triangle or not.

Figure 10:
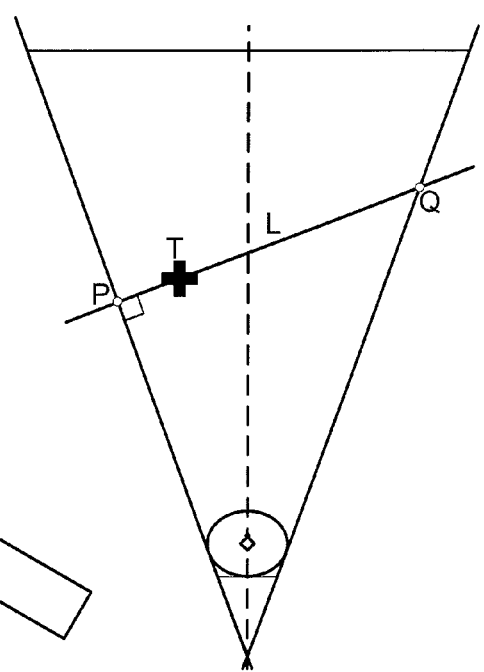
FIG. 10 illustrates an embodiment of calculating whether a point is between imaginary lines.

A further approach is based on using parametric forms of lines. One of the two imaginary lines is chosen. On this line the point P, as illustrated in FIG. 10, where the distance to the POI T, indicated as a cross in FIG. 10, is as small as possible is calculated. The point P can be found using the fact that the shortest distance between the imaginary line and the POI T will be where a line L through the POI T and P is perpendicular to the imaginary line. The line L, passing through the POI T and the point P, is defined by using the parametric form of a line, L=P+a(T−P). Here, a is a scalar value. The line L is thus a line starting in P and that has positive a for all points that are in the direction of T. After this line has been found, the value of a is calculated for the point Q, where the line L intersects the second imaginary line. The value of the scalar a gives us information about where the POI T is relative to the two imaginary lines. If a has a value that is larger than one, the POI T can be found between the rays, otherwise the POI T is outside of the area.

Any of these approaches can be used for excluding objects/POIs in the excluded area described with reference to FIGS. 3 and 4.

The collection of POIs that the user should be able to hit can be coded into the application, user defined or fed to it from a server. From these one or a set of captured POIs are determined. From this captured (set of) point of interest, which includes all the points of interest that the user could potentially have been pointing at, the application will either present information to the user, or provide the information elsewhere. The captured POIs may be sorted or selected in accordance with some criterion or measurement of the probability of a point of interest being the one the user pointed at, or be handled in some other preferred order.

Figure 13:
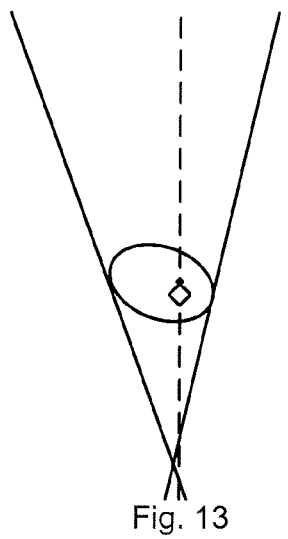
FIG. 13 illustrates a case where the estimation of error of position is not symmetrical around the estimated position and the estimation of error in direction gives same estimates of error on different sides of the estimated direction.
Figure 14:
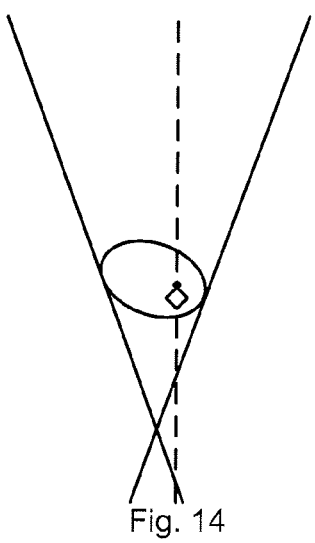
FIG. 14 illustrates a case where the estimation of error of position is not symmetrical around the estimated position and the estimation of error in direction gives same estimates of error on different sides of the estimated direction.
Figure 15:
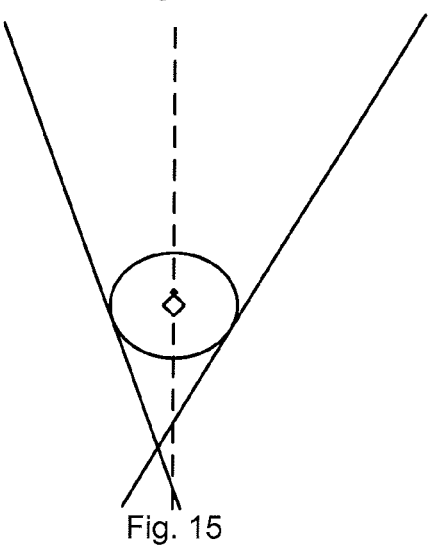
FIG. 15 illustrates a case where the estimation of error of position is symmetrical around the estimated position and the estimation of error in direction gives different estimates of error on different sides of the estimated direction.

In FIGS. 2 to 10, for the sake of easier understanding, the relation between the estimated direction, the imaginary lines, and the estimated area of error of position have been drawn as symmetrical around the line of estimated direction. This is not necessarily always the case. The mutual angles between the first imaginary line and the estimated direction and between the second imaginary line and the estimated direction need not be the same; The estimation of error in direction may give different estimates of error on different sides of the estimated direction. Further, the estimation of error of position need not be symmetrical around the estimated position. FIG. 13 illustrates a case where the estimation of error of position is not symmetrical around the estimated position and the estimation of error in direction gives same estimates of error on different sides of the estimated direction. FIG. 14 illustrates a case where the estimation of error of position is not symmetrical around the estimated position and the estimation of error in direction gives same estimates of error on different sides of the estimated direction. FIG. 15 illustrates a case where the estimation of error of position is symmetrical around the estimated position and the estimation of error in direction gives different estimates of error on different sides of the estimated direction. Thus, the cases illustrated in FIGS. 13 to 15 illustrate, similar to FIG. 2, assigned imaginary lines in relation to estimated position and magnitude of error of estimated position. In other senses, the features and approaches demonstrated with reference to FIGS. 2 to 10 are applicable to the cases illustrated with reference to FIGS. 13 to 15, which for the sake of conciseness are not illustrated and elucidated in detail.

Figure 12:
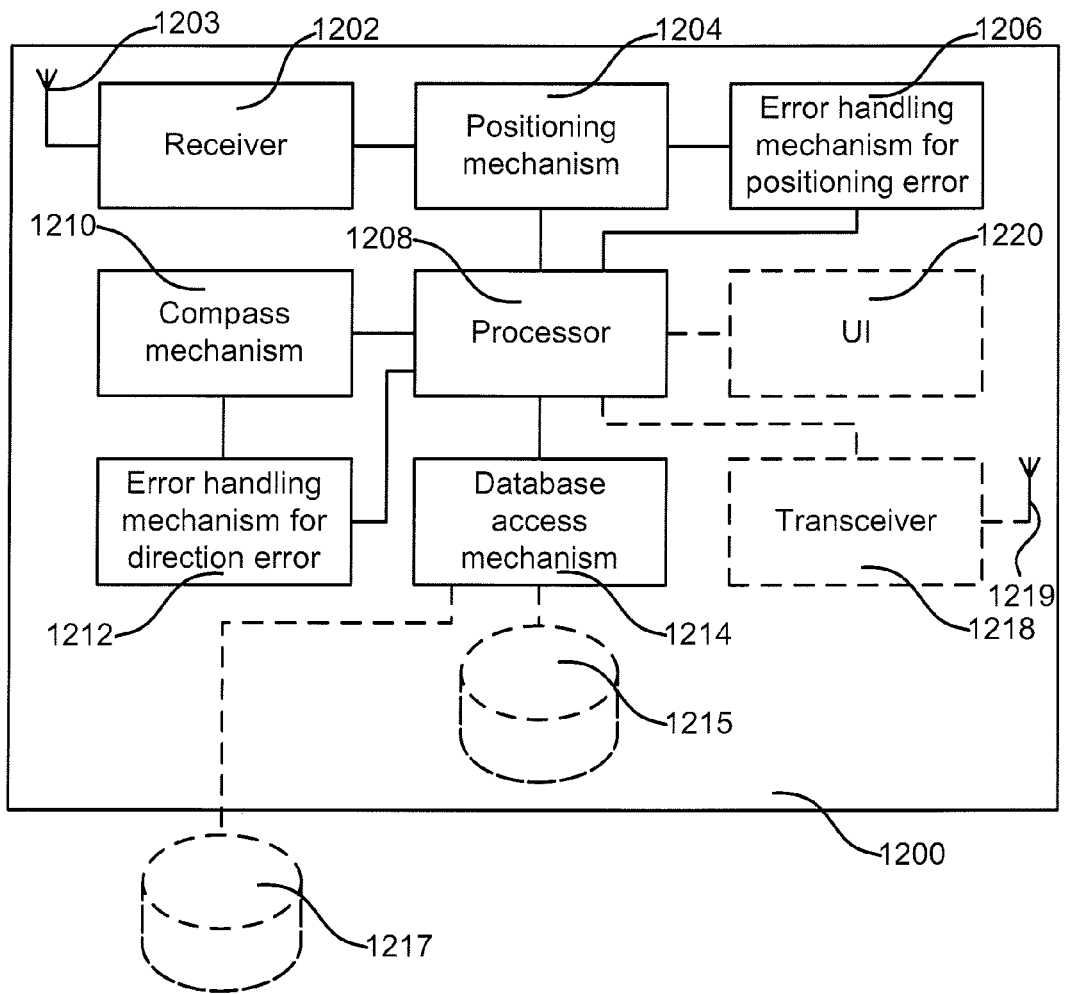
FIG. 12 is a block diagram schematically illustrating an apparatus.

FIG. 12 is a block diagram schematically illustrating an electronic apparatus 1200 for determining an object associated with a POI as described above. The block diagram illustrates several embodiments, where hashed lines indicate optional elements or elements which can be provided as alternatives, as will be further clarified below.

The electronic apparatus 1200 comprises a receiver 1202 arranged to receive one or more signals, preferably via an antenna 1203, from which signals a position of the electronic apparatus can be determined. The signals can be provided from satellites of a GNSS system, from base stations of a cellular telecommunication system, and/or from access points of a wireless local area network. The signals are processed by a positioning mechanism 1204 which determines an estimate of the position of the electronic apparatus 1200 from the received signals. The determination is performed according to known procedures in the art. In addition to the estimation of position, an error handling mechanism 1206, which may be integrated into the positioning mechanism 1204, estimates a magnitude of error of the positioning estimate. The positioning estimate and the estimate of the magnitude of error of the positioning estimate are provided to a processor 1208.

The electronic apparatus 1200 further comprises a compass mechanism 1210 which determines an estimate of the direction of the electronic apparatus 1200. The direction can be estimated from a magnetic sensor sensing earth magnetic field, and possibly with aid of accelerometer sensor for compensating and/or determining direction in vertical direction. The determination is performed according to known procedures in the art, and may give a result as a direction in the horizontal plane, or a direction in space. Thus, the term "compass" mechanism should be interpreted accordingly, i.e. as either direction estimating mechanism for the horizontal plane, or direction estimating mechanism for the space, for respective embodiments. In addition to the estimation of direction, an error handling mechanism 1212, which may be integrated into the compass mechanism 1210, estimates a magnitude of error of the direction estimate. The direction estimate and the estimate of the magnitude of error of the direction estimate are provided to the processor 1208.

The electronic apparatus 1200 further comprises a database access mechanism 1214, which is enabled to access a database 1215, 1217 with POI items. This can be an internal database 1215 provided in the electronic apparatus 1200, or an external database 1217 provided elsewhere and accessed via communication means of the electronic apparatus 1200, e.g. a transceiver 1218 communicating for example with a base station of a telecommunication system or with an access point of a wireless local area network, preferably via an antenna 1219, such that the external database is accessable for example via the Internet or at a service centre of the communication system or network. The database access mechanism 1214 provides information about POIs to the processor 1208. The database access mechanism 1214 can be integrated into the processor 1208.

The processor 1208 is thus in the possession of an estimate of the position of the electronic apparatus 1200, an estimate of the magnitude of error of the estimate of the position, a direction estimate, and an estimate of the magnitude of error of the direction estimate, and is capable of accessing a database 1215, 1217 holding relevant POIs. According to any of the approaches demonstrated above, the processor 1208 calculates two intersecting imaginary lines in a model of the environment of the electronic apparatus 1200 such that an area between the two imaginary lines is formed with aid of a determined maximum distance of sight, and with information from the database 1215, 1217 and the formed area in the model of the environment, e.g. map or coordinate system, a POI associated with an object at which the electronic apparatus is pointed at is obtained.

According to the above demonstrated approaches of capturing the relevant POI, the processor 1208 is able to perform ray tracing, exclude parts of area behind the user, performing statistical analysis, determining whether the object is present within the area, etc. to obtain the correct object. However, at certain circumstances, not only one object can be determined. In such cases, either the obtained set of objects/POIs is provided as a hit list, or a user is involved in selecting from the hit list, e.g. from a user interface 1220, UI, where information about the captured POIs is presented for example on a display of the UI 1220 with name, type, and/or picture such that the user can interact in the selection of the correct POI. The UI 1220 can also be used for the presentation of the result of the determination of the object/POI. The result of the determined object/POI can also be transmitted via the transceiver 1218 for further processing, e.g. as in the trash can use case demonstrated above, or for returning further information about the object by searching the Web.

Figure 11:
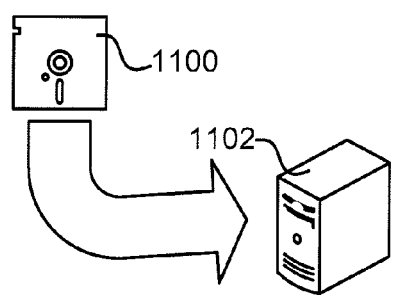
FIG. 11 schematically illustrates a computer readable medium for holding a computer program, and a processing device for executing the computer program.

The embodiments of the method according to the present invention are suitable for implementation with aid of processing means, such as computers and/or processors, especially for the case where an electronic apparatus as described with reference to FIG. 12, such as a mobile phone, a personal digital assistant or GNSS receiver apparatus, is to a large extent implemented by processor and software. Therefore, there is provided computer programs, comprising instructions arranged to cause the processing means, processor, or computer to perform the steps of any of the embodiments described with reference to FIGS. 1 to 10. The computer programs preferably comprises program code which is stored on a computer readable medium 1100, as illustrated in FIG. 11, which can be loaded and executed by a processing means, processor, or computer 1102 to cause it to perform the method, respectively, according to the embodiments. The computer 1102 and computer program product 1100 can be arranged to execute the program code sequentially where actions of the any of the methods are performed stepwise. The processing means, processor, or computer 1102 is preferably what normally is referred to as an embedded system. Thus, the depicted computer readable medium 1100 and computer 1102 in FIG. 11 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of determining an object in sight, the object being associated with a Point-Of-Interest (POI) item in a database, the method comprising:
   estimating a position of an electronic apparatus;
   estimating a magnitude of error of the estimated position;
   estimating a direction in which the electronic apparatus is facing using a magnetic sensor of the electronic apparatus;
   estimating a magnitude of error of the estimated direction;
   calculating two intersecting imaginary lines in a model of an environment of the electronic apparatus, wherein the two imaginary lines intersect a line of the estimated direction at a side of the electronic apparatus distal to said object, a mutual angle between the two imaginary lines and the line of the estimated direction is based on the estimated magnitude of error of the estimated direction, and the position where the imaginary lines intersect is determined from the estimated position and the magnitude of error of the estimated position, such that an area between the two imaginary lines is formed based on a determined maximum distance of sight; and
   determining a POI associated with a position within said area such that information about the object associated with the determined POI is obtainable.

2. The method according to claim 1, wherein a POI is enabled to have a physical dimension, the method further comprising
   tracing along each of the two imaginary lines such that a POI whose dimension intersects any of the imaginary lines is determined such that information about the object associated with the determined POI is obtainable.

3. The method according to claim 1, further comprising excluding, when considering the area, a part of the area defined between the position where the imaginary lines intersect, between the imaginary lines, and an imaginary area around the estimated position drawn up by the estimated magnitude of error of position.

4. The method according to claim 1, wherein the estimating magnitude of error of estimated direction comprises assigning a predetermined magnitude of error.

5. The method according to claim 1, wherein the estimating magnitude of error of estimated direction comprises taking a number of samples of direction measurement, and estimating the magnitude of error based on said samples using a statistical model.

6. The method according to claim 1, wherein the determining of a POI associated with a position within said area comprises:
   determining a direction between the position where the imaginary lines intersect and a candidate POI; and
   comparing the direction with the imaginary lines, wherein the candidate POI is considered associated with a position within said area if the direction is between the imaginary lines.

7. The method according to claim 1, wherein the determining of a POI associated with a position within said area comprises
   defining the determined maximum distance of sight as a line perpendicular to the estimated direction;
   defining a triangle from the imaginary lines and the determined maximum distance of sight; and
   calculating Barycentric coordinates of the POI in the triangle, wherein the candidate POI is considered associated with a position within said area if all of the Barycentric coordinates are between 0 and 1.

8. The method according to claim 1, wherein the determining of a POI associated with a position within said area comprises
   determining a point P along one of the imaginary lines being closest to a candidate POI;
   determining a help line comprising the point P and a position T of the candidate POI such that the line is described by $L=P+a(T-P)$, where a is a scalar value and L, P and T are matrices; and
   determine the scalar a for a point Q where the help line intersects the other of the imaginary lines, wherein the candidate POI is considered associated with a position within said area if the scalar a is 1 or greater for that point.

9. A computer program comprising a non-transitory computer readable medium storing computer program code comprising instructions to cause a processor on which the computer program code is executed to perform a method, the method comprising:
   estimating a position of an electronic apparatus;
   estimating a magnitude of error of the estimated position;
   estimating a direction in which the electronic apparatus is facing using a magnetic sensor of the electronic apparatus;
   estimating a magnitude of error of the estimated direction;
   calculating two intersecting imaginary lines in a model of an environment of the electronic apparatus, wherein the two imaginary lines intersect a line of the estimated direction at a side of the electronic apparatus distal to said object, a mutual angle between the two imaginary lines and the line of the estimated direction is based on the estimated magnitude of error of the estimated direction, and the position where the imaginary lines intersect is determined from the estimated position and the magnitude of error of the estimated position, such that an area between the two imaginary lines is formed based on a determined maximum distance of sight; and
   determining a POI associated with a position within said area such that information about the object associated with the determined POI is obtainable.

10. An electronic apparatus comprising:
    a positioning mechanism operable to determine a position of the electronic apparatus;
    a compass comprising at least one magnetic sensor; and
    a processor arranged to:
    (i) provide an estimate of a magnitude of error of an estimated position of the electronic apparatus;
    (ii) provide an estimate of a magnitude of error of an estimated direction;
    (iii) access a database with a Point-Of-Interest, POI, item, wherein the POI item is associated with an object to be identifiable with aid of the electronic apparatus when in sight; and
    (iv) calculate two intersecting imaginary lines in a model of an environment of the electronic apparatus, wherein the two imaginary lines intersect a line of the estimated direction at a side of the electronic apparatus distal to said object, and where a mutual angle between the two imaginary lines and the line of the estimated direction is based on the estimated magnitude of error of estimated direction, and the position where the imaginary lines intersect is determined from the estimated position and the magnitude of error of estimated position, such that an area between the two imaginary lines is formed based on a determined maximum distance of sight, and to determine, from the database, a POI associated with a position within said area such that information about the object associated with the determined POI is obtainable.

11. The electronic apparatus according to claim 10, wherein a POI is enabled to have a physical dimension, and the processor is further arranged to trace along each of the two imaginary lines such that a POI whose dimension intersects any of the imaginary lines is determined such that information about the object associated with the determined POI is obtainable.

12. The electronic apparatus according to claim 10, wherein the processor further is arranged to exclude, when considering the area, a part of the area defined between the position where the imaginary lines intersect, between the imaginary lines, and an imaginary area around the estimated position drawn up by the estimated magnitude of error of position.

13. The electronic apparatus according to claim 10, wherein the processor further is arranged to receive a number of samples of direction measurement from the compass such that an estimate of the magnitude of error is based on said samples using a statistical model.

14. The electronic apparatus according to claim 10, further comprising a user interface, UI, and an application, wherein the application is arranged to receive information about the object associated with the determined POI, to process the information into presentation information, and to provide the presentation information to the UI such that it is user perceivable.

15. The electronic apparatus according to claim 14, wherein the application further is arranged to receive through the UI a user input in response to the presentation information.

16. The electronic apparatus according to claim 14, further comprising a transceiver arranged to communicate with a communication network, wherein the application is further arranged to transmit information about the determined POI via the transceiver.

17. The electronic apparatus of claim 10, wherein the processor includes:
   an error handling mechanism for positioning error;
   an error handling mechanism for direction error; and
   a database access mechanism for accessing the database.

* * * * *